US012781840B2

(12) United States Patent
Hendershot et al.

(10) Patent No.: US 12,781,840 B2
(45) Date of Patent: Nov. 3, 2026

(54) CONTINUOUS ROLLED CORE RING WITH BUTT CONNECTIONS

(71) Applicant: Schaeffler Technologies AG & Co. KG, Herzogenaurach (DE)

(72) Inventors: Trent Hendershot, Wooster, OH (US); Eldin Becirovic, Akron, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 19/188,267

(22) Filed: Apr. 24, 2025

(65) Prior Publication Data

US 2026/0338265 A1 Oct. 29, 2026

(51) Int. Cl.
*F16H 41/28* (2006.01)
*B21D 22/02* (2006.01)
*F16H 41/24* (2006.01)

(52) U.S. Cl.
CPC ............. *F16H 41/28* (2013.01); *B21D 22/02* (2013.01); *F16H 41/24* (2013.01); *Y10T 29/4933* (2015.01)

(58) Field of Classification Search
CPC .......... F16H 41/28; F16H 41/24; B21D 22/02
See application file for complete search history.

(56) References Cited

U.S. PATENT DOCUMENTS 2,917,001 A * 12/1959 Zeidler ................... F16H 41/28 60/362
3,782,855 A * 1/1974 Batteux ................... F16D 33/18 416/180
4,466,566 A * 8/1984 Good ..................... B21D 53/18 72/352
5,109,604 A * 5/1992 Koebele .................. F16H 41/28 29/889.21
5,113,654 A * 5/1992 Sahashi ................... F16H 41/28 60/330
7,020,596 B1 * 3/2006 Miller ................ G05B 19/4097 700/98

(Continued)

FOREIGN PATENT DOCUMENTS

| | | | |
|---|---|---|---|
| DE | 102008046233 | A1 | 3/2010 |
| JP | 2017145938 | A | 8/2017 |
| KR | 1020100077491 | A | 7/2010 |

OTHER PUBLICATIONS

Ministry of Intellectual Property of the Republic of Korea, International Search Report and Written Opinion for International Application No. PCT/US2026/024811 dated Aug. 27, 2026, 9 pages.

*Primary Examiner* — Dustin T Nguyen
(74) *Attorney, Agent, or Firm* — Suiter Swantz IP

(57) ABSTRACT

A rolled and welded core ring may be made from a narrow strip with opposing circumferential ends that are connected by a butt connection, resulting in less scrap. The strip may be rolled continuously to form an arc segment with the opposing circumferential ends. The butt connection may be formed by a weld or braze after rolling the strip into the arc segment. Slots may be pierced in the arc segment after the butt connection is formed. Piercing the slots after rolling into the arc segment may be beneficial to improve the ductility of the slots, reducing a likelihood of cracking. The arc segment and butt connection may then be stamped to form the profile of the core ring.

20 Claims, 14 Drawing Sheets

(56) References Cited

U.S. PATENT DOCUMENTS

| | | | | |
|---|---|---|---|---|
| 7,854,588 | B2 * | 12/2010 | George | F16H 41/26 416/214 A |
| 8,056,330 | B2 | 11/2011 | Parks et al. | |
| 9,651,129 | B2 | 5/2017 | Dattawadkar | |
| 10,047,843 | B2 * | 8/2018 | Hepler | F16H 41/28 |
| 10,054,206 | B2 * | 8/2018 | Gurney | F16H 41/28 |
| 11,852,225 | B2 | 12/2023 | Ledesma et al. | |
| 11,951,525 | B2 | 4/2024 | Miessmer et al. | |
| 2009/0013683 | A1 * | 1/2009 | Parks | F16H 41/28 60/330 |
| 2016/0230865 | A1 | 8/2016 | Schrader | |
| 2017/0030450 | A1 | 2/2017 | Boigegrain et al. | |
| 2017/0350487 | A1 | 12/2017 | Müller et al. | |
| 2020/0256441 | A1 * | 8/2020 | Keller | F01D 5/323 |
| 2023/0349455 | A1 | 11/2023 | Ledesma et al. | |

* cited by examiner

100

100

SECTION A-A

100

440

CONTINUOUS ROLLED CORE RING WITH BUTT CONNECTIONS

TECHNICAL FIELD

The present disclosure generally relates to rotary fluid gearing, and more particularly, to details of rotary fluid gearing with respect to blade attachment.

BACKGROUND

Within torque converter assemblies, core rings are provided that are attached to another portion of the torque converter, such as blades of a turbine or an impeller. Core rings are known to have a low utilization. The core rings may be stamped from a sheet metal blank. Stamping the core ring from the sheet metal blank may result in low utilization of the blank. The sheet metal blank is required to be bigger than the outer diameter of the core ring which results in low material utilization. For instance, the inner diameter of the core rings may be scrap. The scrap may be unused and must be recycled.

SUMMARY

A core ring for a torque converter is described, in accordance with one or more embodiments of the present disclosure. The core ring may include: an arc segment revolved about a center axis of the core ring, the arc segment including a first circumferential end and a second circumferential end disposed at opposing ends of the arc segment, the first circumferential end and the second circumferential end abutting end-to-end without overlapping, the arc segment includes a curved-base portion, the curved-base portion defining a plurality of blade slots in a polar array about the center axis of the core ring; and a butt connection connecting between the first circumferential end and the second circumferential end.

In some aspects, a base metal of the curved-base portion defining the plurality of blade slots includes a smaller grain microstructure than the base metal of the curved-base portion disposed between the plurality of blade slots.

In some aspects, the arc segment is formed of a flat strip which is rolled to form the arc segment as a flat-annular shape, wherein the first circumferential end and the second circumferential end are connected by the butt connection after rolling, wherein the arc segment is pierced to define the plurality of blade slots after the butt connection connects the first circumferential end and the second circumferential end, wherein the arc segment and the butt connection are stamped to form the curved-base portion after the plurality of blade slots are defined.

In some aspects, the arc segment includes a sheet thickness, wherein the sheet thickness decreases along a radial width of the arc segment.

In some aspects, the arc segment is continuous between the first circumferential end and the second circumferential end.

In some aspects, the butt connection is one of a weld joint or a braze joint.

In some aspects, the butt connection is disposed between a pair of adjacent of the plurality of blade slots.

In some aspects, the curved-base portion is a curved-annular shape with an inner bend and an outer bend.

In some aspects, the arc segment includes an inner-diameter surface, an outer-diameter surface, a blade-side surface, and a stator-side surface, wherein the blade-side surface and the stator-side surface extend between the inner-diameter surface and the outer-diameter surface, wherein the blade-side surface and the stator-side surface define respective of the inner bend and the outer bend.

In some aspects, the curved-base portion includes a peak, wherein the peak is radially disposed between and axially offset from the inner-diameter surface and the outer-diameter surface, wherein the plurality of blade slots are defined through the peak.

In some aspects, the arc segment includes a lip portion, wherein the lip portion protrudes radially outward from the curved-base portion, wherein the first circumferential end, the second circumferential end, and the butt connection are shaped as the curved-base portion and the lip portion, wherein the inner-diameter surface together with radially-inner sections of the blade-side surface and the stator-side surface define the curved-base portion, wherein the outer-diameter surface together with radially-outer sections of the blade-side surface and the stator-side surface define the lip portion.

In some aspects, the curved-base portion is defined by the inner-diameter surface, the outer-diameter surface, the blade-side surface, and the stator-side surface.

In some aspects, a base metal of the arc segment is one of steel, aluminum, or an alloy thereof.

In some aspects, the core ring is one of an impeller core ring or a turbine core ring.

A torque converter is described, in accordance with one or more embodiments of the present disclosure. The torque converter may include: an impeller; and a turbine, at least one of the impeller or the turbine including: a plurality of blades; and a core ring including: an arc segment revolved about a center axis of the core ring, the arc segment including a first circumferential end and a second circumferential end disposed at opposing ends of the arc segment, the first circumferential end and the second circumferential end abutting end-to-end without overlapping, the arc segment includes a curved-base portion, the curved-base portion defining a plurality of blade slots in a polar array about the center axis of the core ring; and a butt connection connecting between the first circumferential end and the second circumferential end; the plurality of blades supported on the core ring, the plurality of blades including a plurality of tabs passing through the plurality of blade slots, the plurality of blades joined to the arc segment of the core ring by the plurality of tabs.

In some aspects, a base metal of the curved-base portion defining the plurality of blade slots includes a smaller grain microstructure than the base metal of the curved-base portion disposed between the plurality of blade slots.

In some aspects, the plurality of tabs are folded over onto the curved-base portion.

A method of manufacturing a core ring is described, in accordance with one or more embodiments of the present disclosure. The method may include: rolling a flat strip into an arc segment, the arc segment including a first circumferential end and a second circumferential end, the first circumferential end and the second circumferential end disposed at opposing ends of the arc segment, the first circumferential end and the second circumferential end abutting end-to-end without overlapping; connecting the first circumferential end and the second circumferential end by a butt connection; piercing the arc segment to define a plurality of blade slots; and stamping the arc segment and the butt connection to form a curved-base portion, the core ring including: the arc segment revolved about a center axis of the core ring, the arc segment including the curved-base portion, the curved-base portion defining the plurality of blade slots in a polar array about the center axis of the core ring; and the butt connection connecting between the first circumferential end and the second circumferential end.

In some aspects, a base metal of the curved-base portion defining the plurality of blade slots includes a smaller grain microstructure than the base metal of the curved-base portion disposed between the plurality of blade slots.

In some aspects, the plurality of blade slots are defined in the arc segment after the arc segment is connected by the butt connection.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1A:
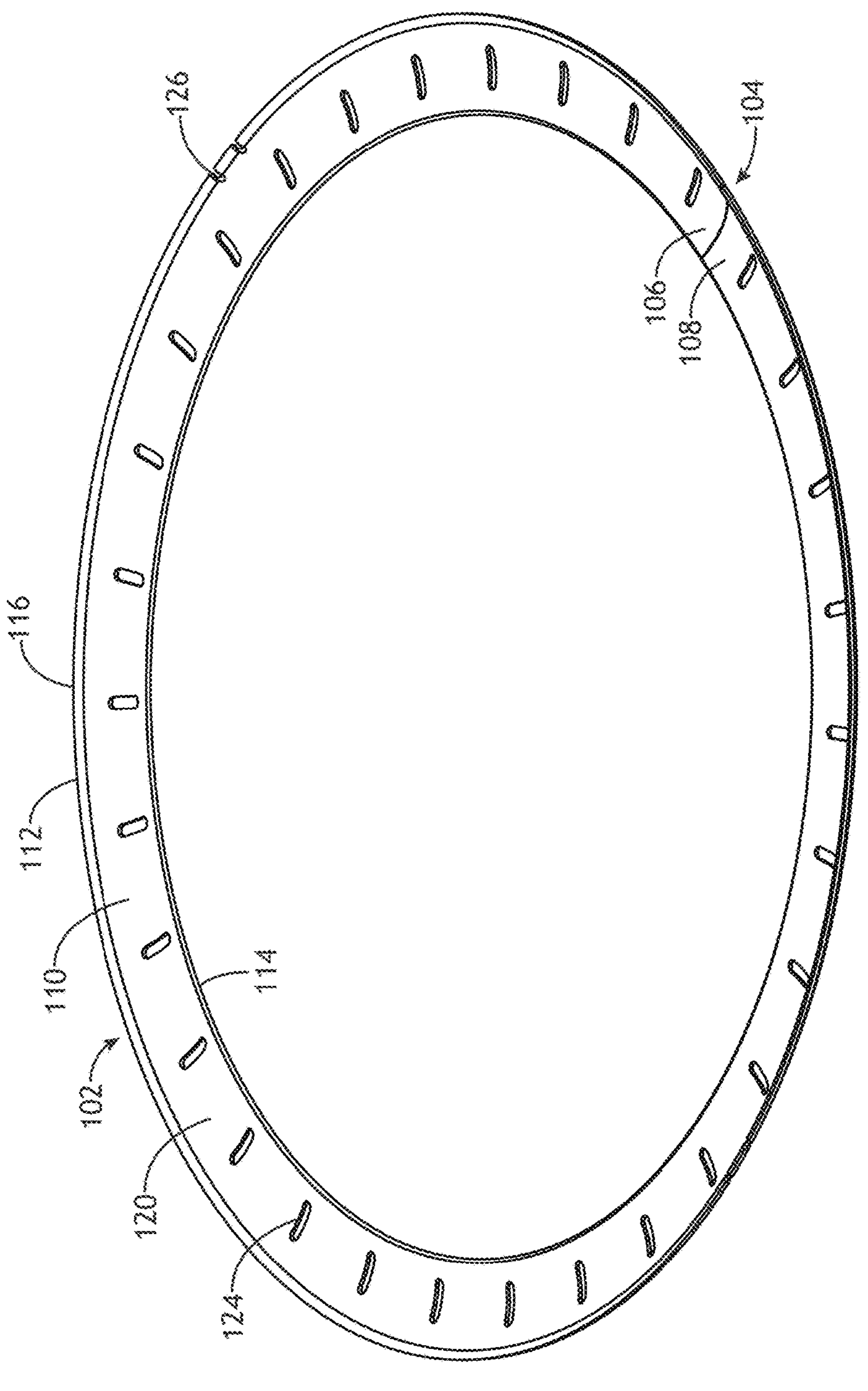
FIG. 1A illustrates a perspective view of a core ring, in accordance with one or more embodiments of the present disclosure.
Figure 1B:
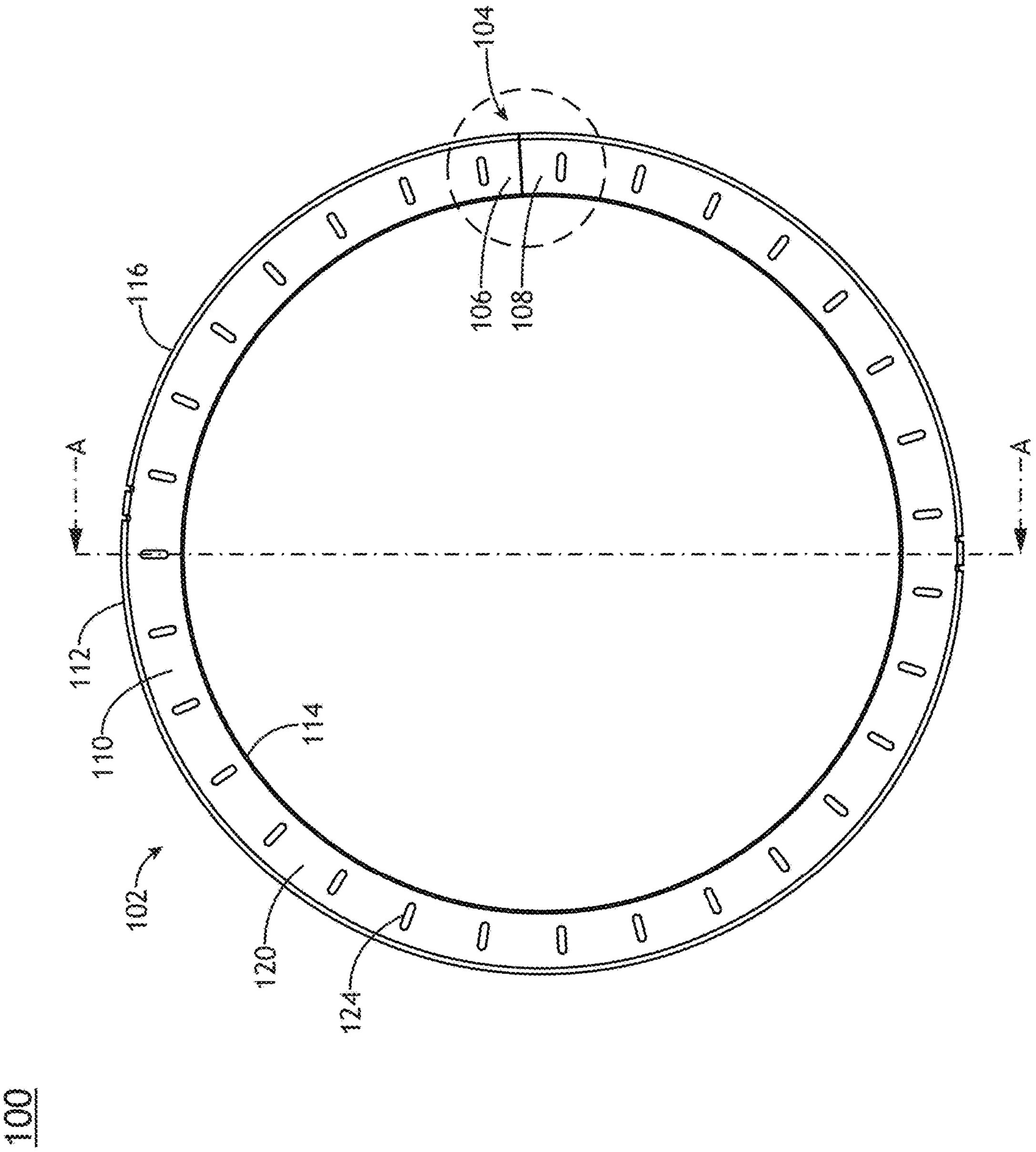
FIG. 1B illustrates a top view of the core ring, in accordance with one or more embodiments of the present disclosure.
Figure 1C:
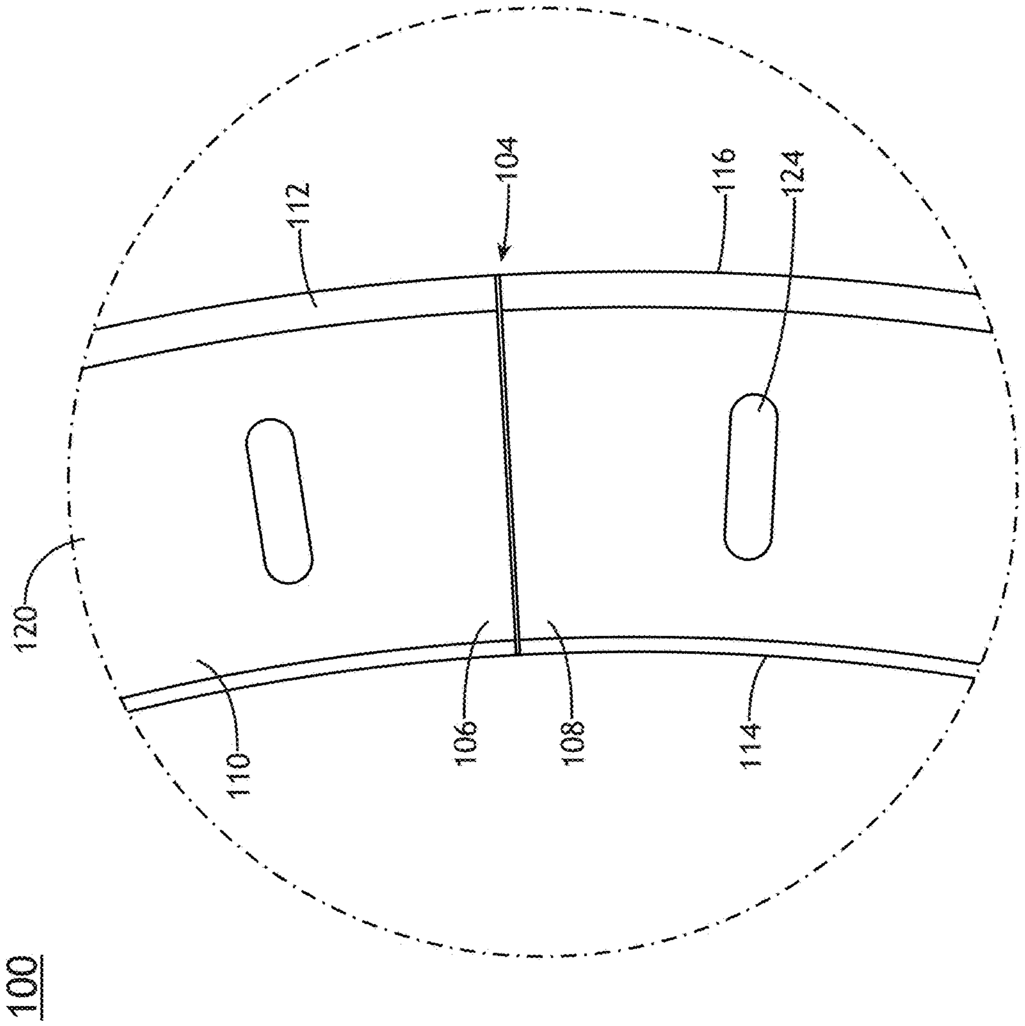
FIG. 1C illustrates a partial view from the top view of the core ring, in accordance with one or more embodiments of the present disclosure.
Figure 1D:
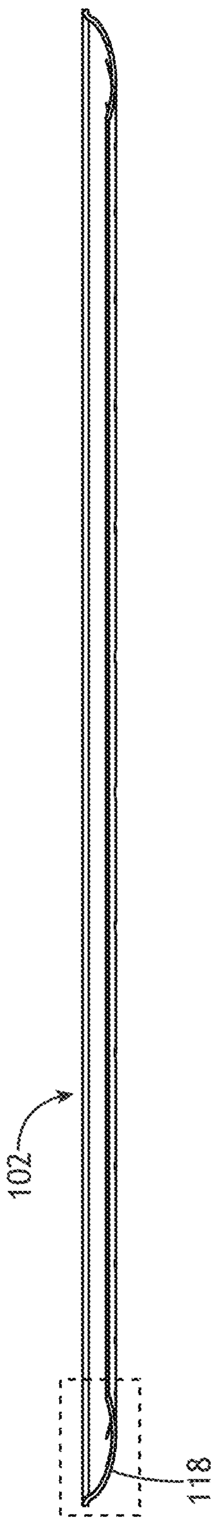
FIG. 1D illustrates a section view A-A from the top view of the core ring, in accordance with one or more embodiments of the present disclosure.
Figure 1E:
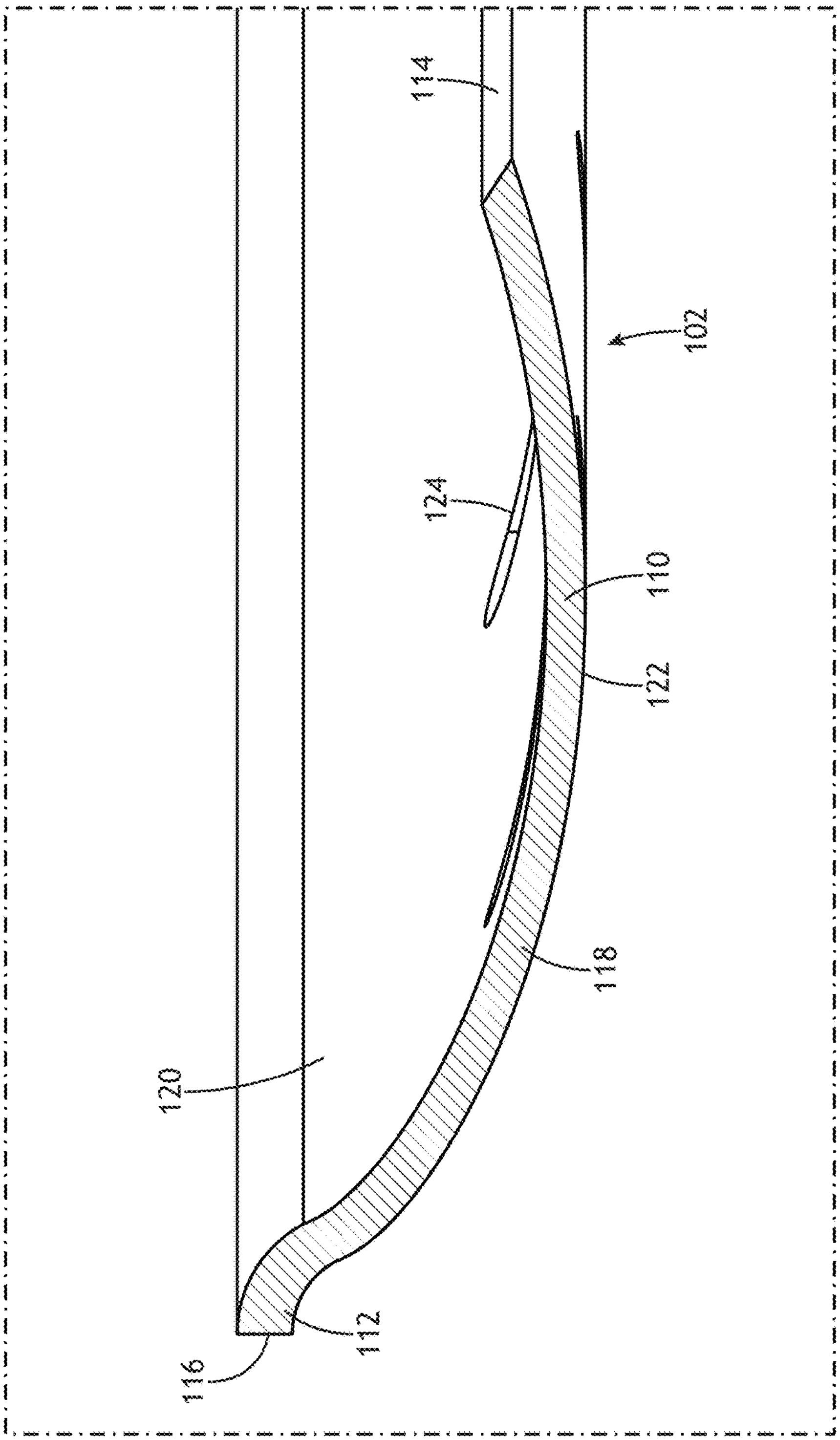
FIG. 1E illustrates a partial view from the section view A-A of the core ring, in accordance with one or more embodiments of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure are directed to a continuous rolled core ring with butt connections. A rolled and welded core ring may be made from a narrow strip with opposing circumferential ends that are connected by a butt connection, resulting in less scrap. The strip may be rolled continuously to form an arc segment with the opposing circumferential ends. The butt connection may be formed by a weld or braze after rolling the strip into the arc segment. Slots may be pierced in the arc segment after the butt connection is formed. Piercing the slots after rolling into the arc segment may be beneficial to improve the ductility of the slots, reducing a likelihood of cracking. The arc segment and butt connection may then be stamped to form the profile of the core ring.

FIGS. 1A-1E illustrate a core ring 100, in accordance with one or more embodiments of the present disclosure. The core ring 100 may also be referred to as a rolled core ring. The core ring 100 may include an arc segment 102 and/or a butt connection 104.

The arc segment 102 may be revolved about a center axis of the core ring 100. The arc segment 102 may include a first circumferential end 106 and a second circumferential end 108. The first circumferential end 106 and the second circumferential end 108 may be disposed at opposing ends of the arc segment 102. The first circumferential end 106 and the second circumferential end 108 may abut end-to-end without overlapping. In this regard, the first circumferential end 106 and the second circumferential end 108 may be co-planar.

The butt connection 104 may also be referred to as a butt joint. The butt connection 104 may connect between the first circumferential end 106 and the second circumferential end 108. The arc segment 102 may be continuous between the first circumferential end 106 and the second circumferential end 108. The arc segment 102 being continuous may mean that the core ring 100 is not formed of multiple arc segments. Instead, the core ring 100 may be formed of one of the arc segments 102 which is connected at the first circumferential end 106 and the second circumferential end 108 by the butt connection 104.

The butt connection 104 may be a weld joint or a braze joint. In embodiments, the butt connection 104 is the weld joint. The weld joint may include a fusion zone and/or a heat-affected zone. The fusion zone may be an alloy of a base metal of the arc segment 102 and a filler metal (e.g., filler rod metal). The heat-affected zone may be the base metal of the arc segment 102 which has a microstructure which changed when the fusion zone and heat-affected zone were heated and cooled to form the butt connection 104. In embodiments, the butt connection 104 is the braze joint. The braze joint may include the filler metal which does not form an alloy with the base metal of the arc segment 102. It is contemplated that the butt connection 104 being the weld joint may be desirable to increase the strength of the butt connection 104 as compared to the braze joint. The filler metal may any suitable filler metal which may form the weld joint and/or the braze joint with the base metal of the arc segment 102. The filler metal may or may not be the same material as the base metal.

The arc segment 102 may be made of the base metal. The base metal may be a metal material such as, but not limited to, steel (e.g., low-carbon steel), aluminum, an alloy thereof, or the like. For example, the base metal may be carbon-steel 1018 or the like.

The arc segment 102 may include one or more portions, such as, but not limited to, a curved-base portion 110 and/or a lip portion 112. The lip portion 112 may protrude radially outward from the curved-base portion 110. The first circumferential end 106, the second circumferential end 108, and/or the butt connection 104 may be shaped as the curved-base portion 110 and/or the lip portion 112.

The arc segment 102 may include one or more surfaces, such as, but not limited to, an inner-diameter surface 114, an outer-diameter surface 116, a blade-side surface 118, and/or a stator-side surface 120. The inner-diameter surface 114 and the outer-diameter surface 116 may be disposed at respective of an inner diameter and an outer diameter of the arc segment 102. The blade-side surface 118 and/or the stator-side surface 120 may extend between the inner-diameter surface 114 and the outer-diameter surface 116.

The inner-diameter surface 114 and the outer-diameter surface 116 may or may not extend axially and/or radially. For example, the inner-diameter surface 114 may extend both radially and axially and may not be parallel the center axis. By way of another example, the outer-diameter surface 116 may extend axially and be parallel to a center axis of the core ring 100.

One or more of the surfaces may define one or more of the portions of the arc segment 102. For example, the inner-diameter surface 114 together with radially-inner sections of the blade-side surface 118 and/or the stator-side surface 120 may define the curved-base portion 110. By way of another example, the outer-diameter surface 116 together with radially-outer sections of the blade-side surface 118 and/or the stator-side surface 120 may define the lip portion 112.

The curved-base portion 110 may be a curved-annular shape with an inner bend and an outer bend. The blade-side surface 118 and the stator-side surface 120 may define respective of the inner bend and the outer bend of the curved-base portion 110. The blade-side surface 118 and stator-side surface 120 follow the curved-annular shape of the curved-base portion 110.

The curved-base portion 110 may include a peak 122. The peak 122 may be radially disposed between and axially offset from the inner-diameter surface 114 and the outer-diameter surface 116. For example, the peak 122 may be axially offset from the inner-diameter surface 114 and the outer-diameter surface 116 by the inner-diameter surface 114 being axially disposed between the outer-diameter surface 116 and the peak 122.

The arc segment 102 may define blade slots 124. For example, the curved-base portion 110 may define the blade slots 124. The blade slots 124 may also be referred to as tab slots, blade-tab slots, or the like. The blade slots 124 may be through-hole slots which may be defined axially through the curved-base portion 110. For example, the blade slots 124 may be defined through the peak 122 of the curved-base portion 110.

The blade slots 124 may be defined in a polar array about the center axis of the core ring 100. In this regard, the blade slots 124 may be evenly distributed about the center axis of the core ring 100 and may each spaced be apart from one another in the circumferential direction. The curved-base portion 110 may define any integer number of the blade slots 124. For example, the curved-base portion 110 may define on the order of tens of the blade slots 124 (e.g., between ten and ninety-nine of the blade slots 124).

The blade slots 124 may be oriented radially. For example, a longer portion of the blade slots 124 may be extend radially outwards from the center axis of the core ring 100. A narrower width of the blade slots 124 may extend circumferentially. The blade slots 124 may include any suitable shape with the longer portion and the narrower width, such as, but not limited to, a rounded slot (e.g., a stadium), a rectangular-slots, or the like.

The butt connection 104 may or may not define any of the blade slots 124. In embodiments, the butt connection 104 does not define any of the blade slots 124. Thus, the butt connection 104 may be disposed between a pair of adjacent of the blade slots 124. The butt connection 104 may be harder than the arc segment 102. For example, the butt connection 104 may be the harder than the arc segment 102 where the butt connection 104 is the weld joint. It may be desirable that the blade slots 124 are not formed in the butt connection 104, due to difficulties in piercing the blade slots 124 in the butt connection 104 when the butt connection 104 is harder than the arc segment 102.

The core ring 100 may be manufactured of by a method, such as by being manufactured by a method 400. The arc segment 102 may be formed from a single piece of the base metal. For example, the arc segment 102 may be formed of a flat strip 502 which may be rolled to form the arc segment 102 as a flat-annular shape, the first circumferential end 106 and the second circumferential end 108 may be connected by the butt connection 104 after rolling, the arc segment 102 may be pierced to define the blade slots 124 after the butt connection 104 connects the first circumferential end 106 and the second circumferential end 108, and then the arc segment and the butt connection 104 may be stamped to form the curved-base portion 110 and/or the lip portion 112 after the blade slots 124 are defined.

The arc segment 102 may also define undercuts 126. The undercuts 126 may be defined by the outer-diameter surface 116. For example, the undercuts 126 may be defined axially through the lip portion 112. The undercuts 126 may be beneficial for manufacturing purposes when stamping the core ring 100. The undercuts 118 may provide a stretch web to let the base metal of the arc segment 102 flow during stamping.

The method by which the core ring 100 is manufactured may change one or more properties of the core ring 100. For example, the method may change a sheet thickness of the arc segment 102, may change a grain microstructure of the arc segment 102 (e.g., of the grain microstructure around the blade slots 124), and/or may improve the position, shape, and/or orientation of the blade slots 124.

The arc segment 102 may include a sheet thickness. The sheet thickness may be the material thickness between the blade-side surface 118 and the stator-side surface 120. For example, the sheet thickness of the arc segment 102 may be between 1 mm and 2 mm.

The sheet thickness of the arc segment 102 may or may not be constant along the radial width of the arc segment 102. In embodiments, the sheet thickness of the arc segment 102 is not constant and changes along the radial width. The sheet thickness of the arc segment 102 may decrease along the radial width. The sheet thickness of the arc segment 102 may be thicker along the curved-base portion 110 and thinner along the lip portion 112. For example, the sheet thickness may decrease by up to ten percent along the radial width of the arc segment 102. The sheet thickness of the arc segment 102 may decrease along the radial width due to the method by which the core ring 100 is manufactured. The sheet thickness of the arc segment 102 may decrease along the radial width due to a rolling reduction caused by rolling the flat strip 502 into the arc segment 102.

The base metal of the arc segment 102 may include a grain microstructure. The grain microstructure may be circumferentially elongated (e.g., the grain may be elongated circumferentially and narrowed radially). The circumferential elongation may also increase further along the radial width of the arc segment 102. The grain microstructure may be circumferentially elongated and may increase further along the radial width of the arc segment 102 due to the method by which the core ring 100 is manufactured. The grain microstructure may elongate in the rolling direction. The grain microstructure may also further elongate the due to the rolling reduction in the sheet thickness along the radial width. For example, the grain microstructure may be polar anisotropic.

Piercing the blade slots 124 after rolling the arc segment 102 may also reduce the size of the grain microstructure around the blade slots 124 as compared to the grain microstructure of the remainder of the curved-base portion 110. For example, the base metal of the curved-base portion 110 defining the blade slots 124 may include smaller grain microstructures than the base metal of the curved-base portion 110 disposed between the blade slots 124. Reducing the grain microstructure of the base metal defining the blade slots 124 may be beneficial to increase a ductility of the blade slots 124 and reduce a likelihood of cracking. The increase in ductility may be beneficial because the blade slots 124 may act as a stress riser. In comparison, piercing the blade slots 124 and then rolling the arc segment 102 may elongate the grain microstructures around the blade slots 124, thereby making the blade slots 124 less ductile and more likely to crack.

The position, shape, and/or orientation of the blade slots 124 may be important for aligning the core ring 100 with one or more additional components, as will be described further herein. Piercing the blade slots 124 after rolling the arc segment 102 may prevent the rolling from changing the position, shape, and/or orientation of the blade slots 124. Thus, the position, shape, and/or orientation may be closely controlled by the piercing operation.

Figure 2:
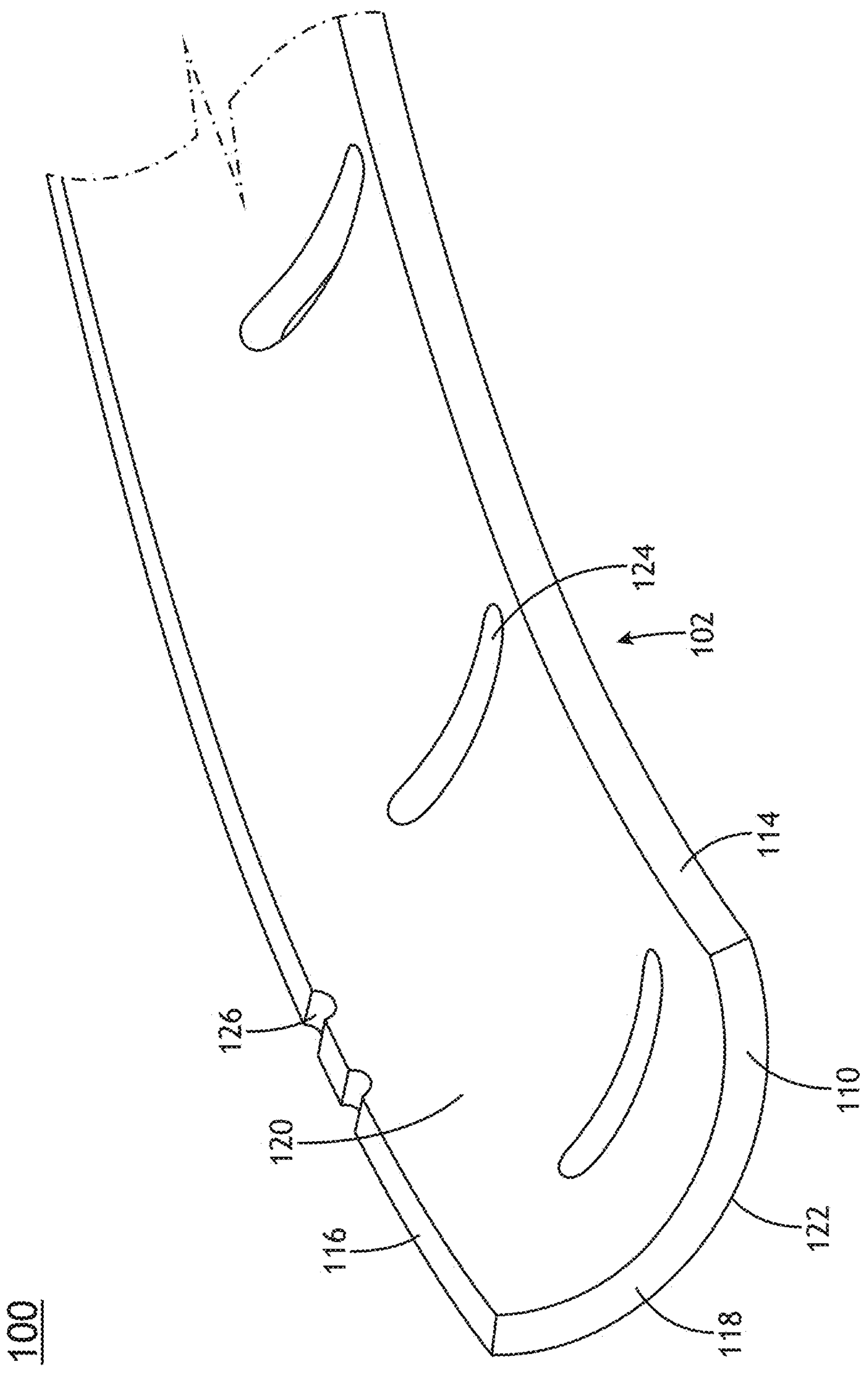
FIG. 2 illustrates a partial perspective cross-section view of the core ring, in accordance with one or more embodiments of the present disclosure.

FIG. 2 illustrates the core ring 100, in accordance with one or more embodiments of the present disclosure. Although the arc segment 102 of the core ring 100 is described as including the lip portion 112, this is not intended as a limitation of the present disclosure. The arc segment 102 may include the curved-base portion 110 which may be defined by the inner-diameter surface 114, the outer-diameter surface 116, the blade-side surface 118, and the stator-side surface 120. However, the addition of the lip portion 112 to the arc segment 102 may strengthen the arc segment 102 and/or increase a resistance to cracking along the blade slots 124.

Figure 3:
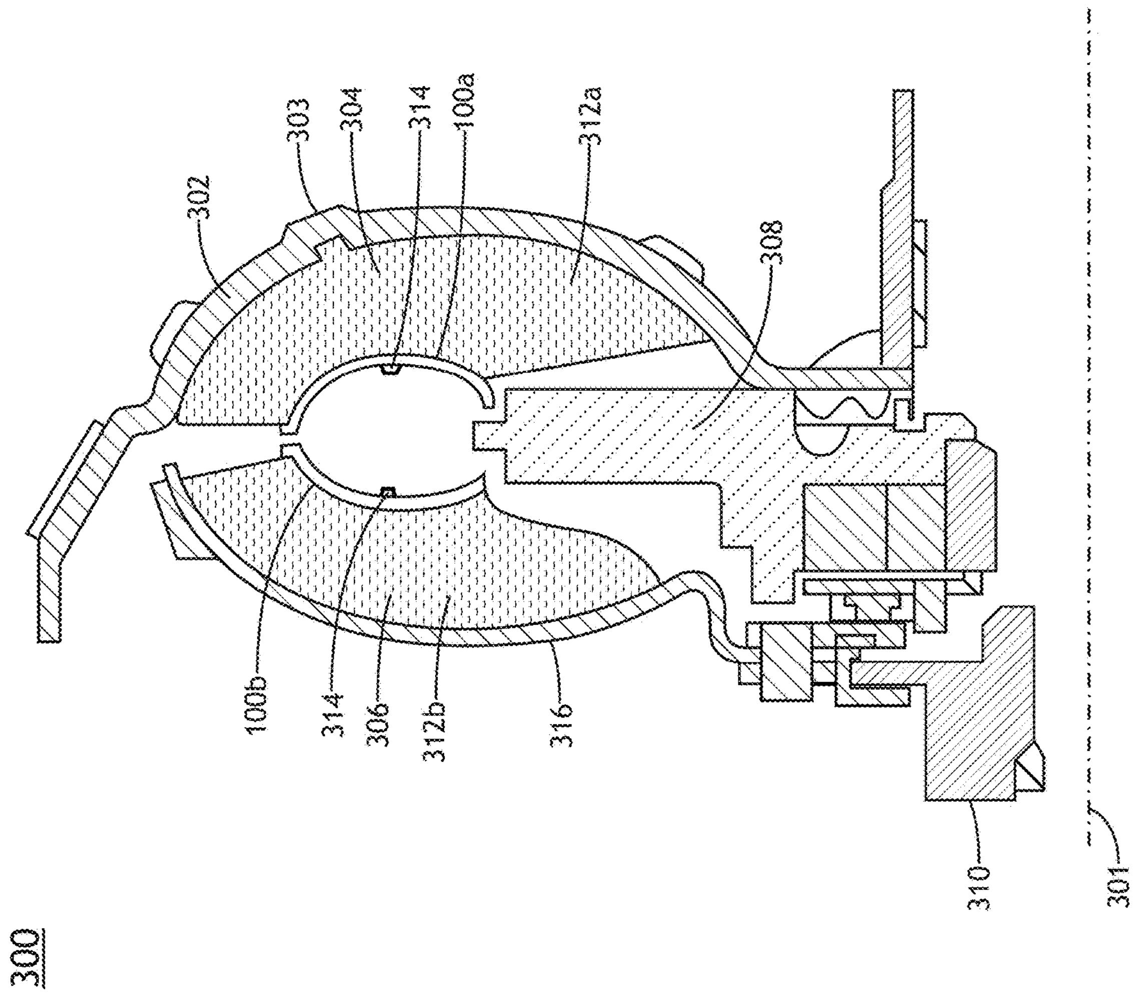
FIG. 3 illustrates a partial cross-section view of a torque converter with the core rings, in accordance with one or more embodiments of the present disclosure.

FIG. 3 illustrates a torque converter 300, in accordance with one or more embodiments of the present disclosure. The core ring 100 may be used for the torque converter 300. The torque converter 300 may include one or more components, such as, but not limited to, core rings 100 (e.g., an impeller core ring **100*a*, a turbine core ring 100*b*), a torque converter cover 302, an impeller shell 303, an impeller 304, a turbine 306, a torque converter stator 308, a torque converter hub 310, blades 312 (e.g., impeller blades 312*a*, turbine blades 312*b*), tabs 314, and/or turbine shell 316. The torque converter 300 may be configured to rotate about a center axis 301. The center axis 301 may be the center axes of the core rings 100. At least one of the impeller 304 or the turbine 306 may include the core rings 100 and/or the blades 312**.

The discussion of the core ring 100 is incorporated herein by reference in the entirety as to the impeller core ring **100*a* and the turbine core ring 100*b*. For example, the impeller core ring 100*a* and the turbine core ring 100*b* may include the arc segment 102 and the butt connection 104**.

The torque converter cover 302 may be a rotational input to the torque converter 300. For example, the torque converter cover 302 may be configured to couple to a crankshaft or flywheel of an internal combustion engine, a rotor hub of an electric motor, a rotor hub of a hybrid module (e.g., a P2 hybrid module or the like), and the like. The torque converter cover 302 may include one or more segments which are affixed together. For example, the torque converter cover 302 may include a front cover (not depicted) and/or an impeller shell 303. The impeller shell 303 may also be referred to as a rear cover. The impeller shell 303 may form a shell of the impeller 304.

The impeller 304 may also be referred to as a pump. The impeller 304 may include the torque converter cover 302, the impeller shell 303, the impeller blades **312*a*, and/or the impeller core ring 100*a*. The impeller blades 312*a* may be supported on a rounded portion of the impeller shell 303 and the impeller core ring 100*a*. The impeller blades 312*a* may include the tabs 314. The tabs 314 may be received by the blade slots 124 of the impeller core ring 100*a***.

The turbine 306 may be disposed opposite to the impeller 304. The turbine 306 may include the turbine blades **312*b*, the turbine shell 316, and/or the turbine core ring 100*b*. The turbine blades 312*b* may be supported on a rounded portion of the turbine shell 316 and the turbine core ring 100*b*. The turbine blades 312*b* may include the tabs 314. The tabs 314 may be received by the blade slots 124 of the turbine core ring 100*b***.

The torque converter stator 308 may be disposed axially between the impeller 304 and the turbine 306. For example, the torque converter stator 308 may be disposed axially between the impeller shell 303 and the turbine shell 316.

The turbine shell 316 may protrude radially inwards and couple with the torque converter hub 310. The torque converter hub 310 may be a radially inner component of the torque converter 300. The torque converter hub 310 may also be referred to as an output part, a pump hub, or the like. The torque converter hub 310 may be the rotational output of the torque converter 300. For example, the torque converter hub 310 may be configured to connect to a transmission input shaft (not depicted). The torque converter hub 310 may include internal splines, for connecting with external splines of the transmission input shaft.

The torque converter 300 may drive the torque converter hub 310 through the rotation of the torque converter cover 302. The torque converter 300 may drive the torque converter hub 310 through the rotation of the torque converter cover 302 using any of the various components of the torque converter 300. The torque converter 300 may drive the torque converter hub 310 through the rotation of the torque converter cover 302 using the impeller 304 and the turbine 306. The torque converter 300 may be a rotary fluid gearing of the hydrokinetic type. For example, the torque converter 300 may be a hydrodynamic torque converter where the kinetic energy of a fluid is increased in the impeller 304 and the kinetic energy is used to drive the turbine 306. The turbine core ring 100*b* and the turbine core ring 100*b* may wrap around respective of the impeller blades 312*a* and the turbine blades 312*b*. The impeller core ring 100*a* and the turbine core ring 100*b* may be curved to enable continuous flow of fluid traveling between the impeller 304 and the turbine 306. The rotatable connection between the torque converter cover 302 and the impeller 304 may cause the impeller 304 to rotate with the torque converter cover 302. Rotation of the turbine 306 may cause fluid to flow from turbine 306 to the impeller 304. The torque converter stator 308 may be disposed axially between the impeller 304 and the turbine 306 to redirect fluid flowing from the turbine 306 before the fluid reaches the impeller 304, to increase the efficiency of torque converter 300. The impeller 304 may receive the flow of fluid, thereby rotating the impeller 304 and the torque converter hub 310.

The core ring 100 may support the blades 312 inside the torque converter 300. The blades 312 may each include the tabs 314 which may pass through the blade slots 124 in respective of the core rings 100. The blades 312 may be joined to the arc segment 102 of the core ring 100 by the tabs 314. The tabs 314 may be folded over onto the curved-base portion 110 (e.g., onto the stator-side surface 120) to create a mechanical joint. The tabs 314 may be joined to the stator-side surface 120 of the core rings 100. For example, the tabs 314 may be joined to the stator-side surface 120 of the core rings 100 by a braze joint, a weld joint, a staked joint (e.g., plastic deformation) into the stator-side surface 120, or the like. The blade slots 124 may align the blades 312 in the polar array about the center axis 301. Ensuring a proper fit between the blades 312 and the core rings 100 is time consuming and labor intensive. If the position, shape, and/or orientation of one or more of the blade slots 124 are not aligned with the tabs 314, then the impeller 304 and/or the turbine 306 may not be assembled. Therefore, ensuring the proper position, shape, and/or orientation the blade slots 124 is desirable.

Figure 4:
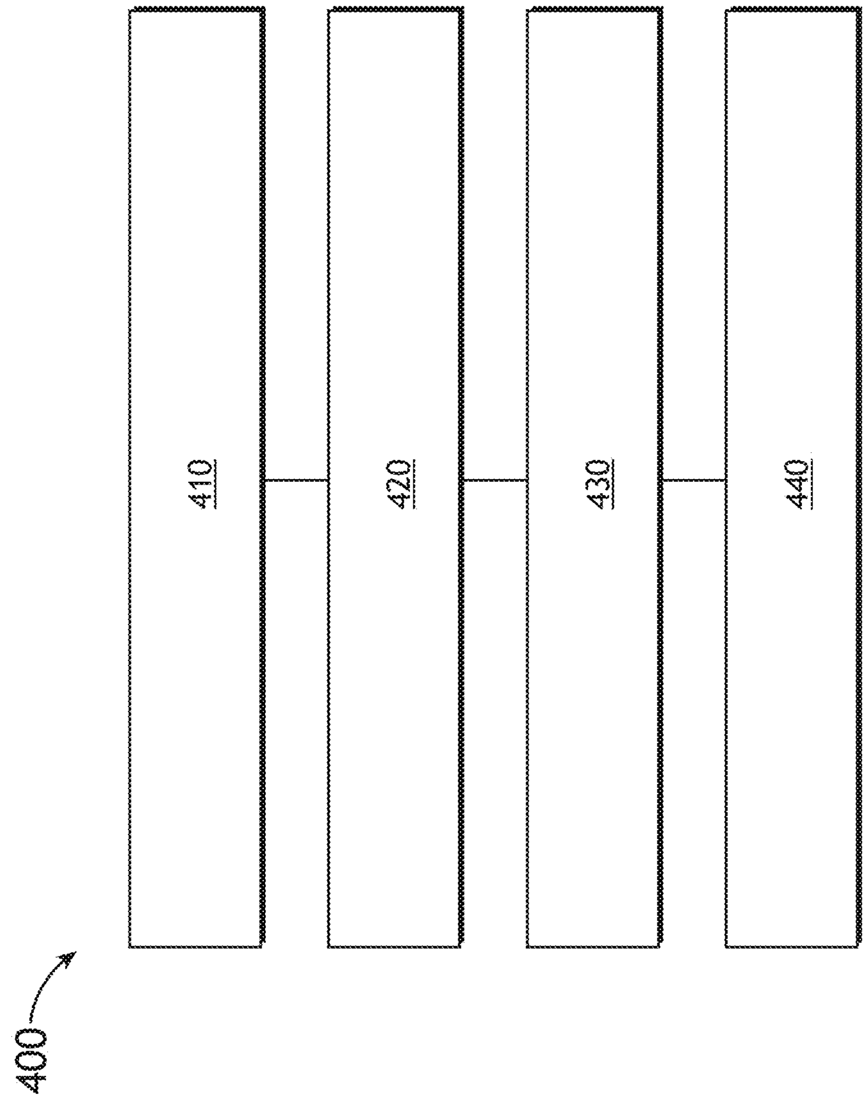
FIG. 4 illustrates a flow diagram of a method of manufacturing the core ring, in accordance with one or more embodiments of the present disclosure.
Figure 5A:
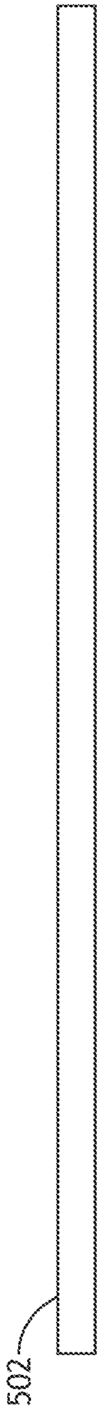
FIG. 5A illustrates a top view of a flat strip, in accordance with one or more embodiments of the present disclosure.
Figure 5B:
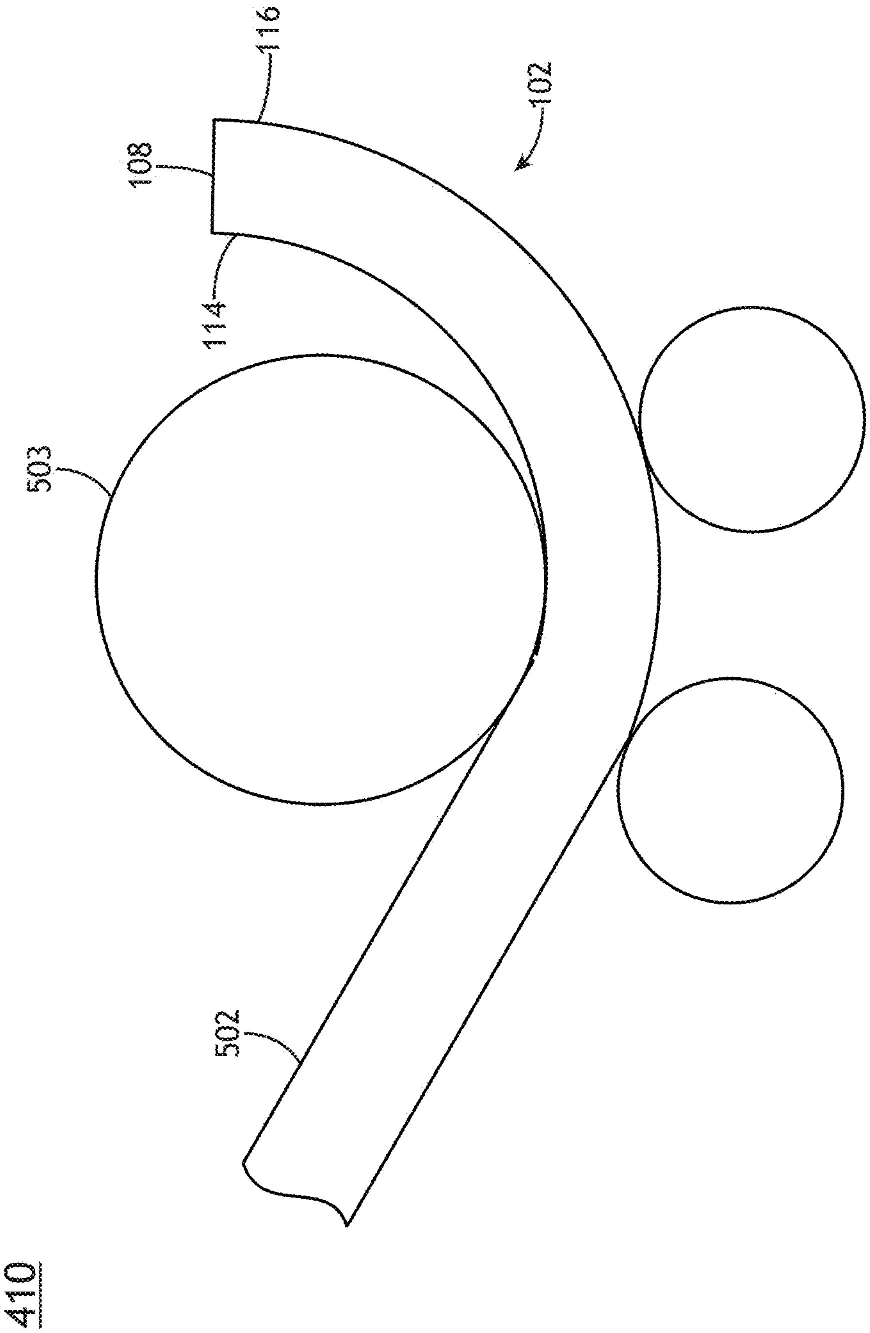
FIG. 5B illustrates a step of rolling the flat strip into an arc segment of the core ring, in accordance with one or more embodiments of the present disclosure.
Figure 5C:
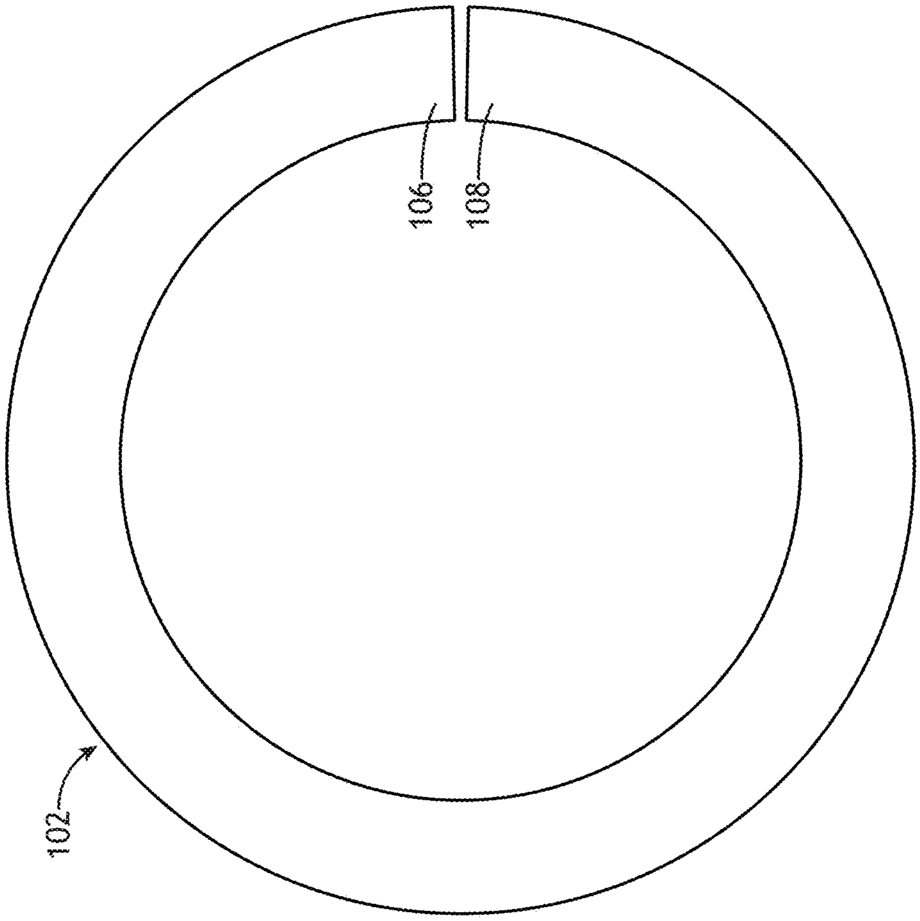
FIG. 5C illustrates a top view of the arc segment after rolling, in accordance with one or more embodiments of the present disclosure.
Figure 5D:
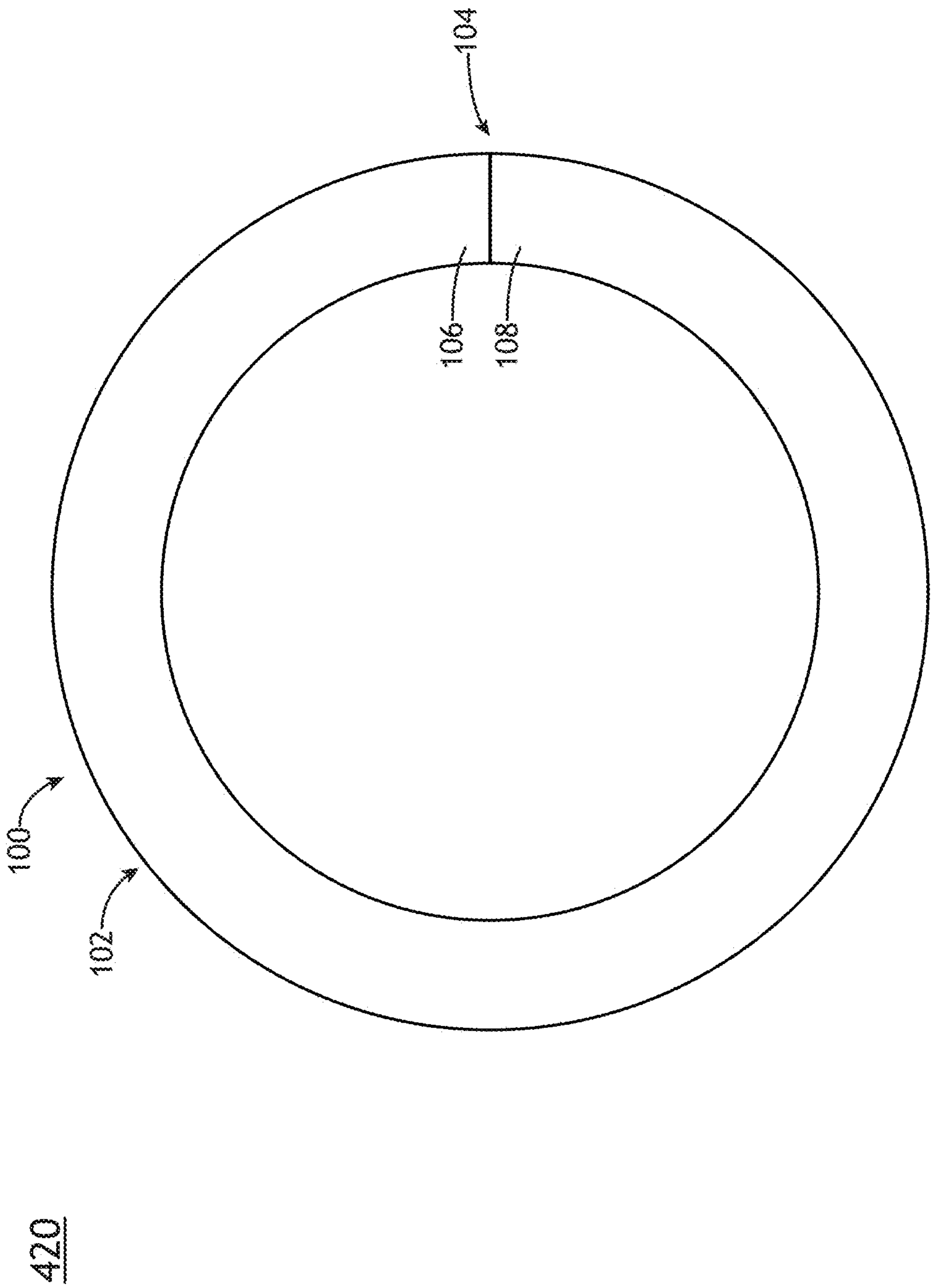
FIG. 5D illustrates a top view of the core ring after circumferential ends of the arc segment are connected by a butt connection, in accordance with one or more embodiments of the present disclosure.
Figure 5E:
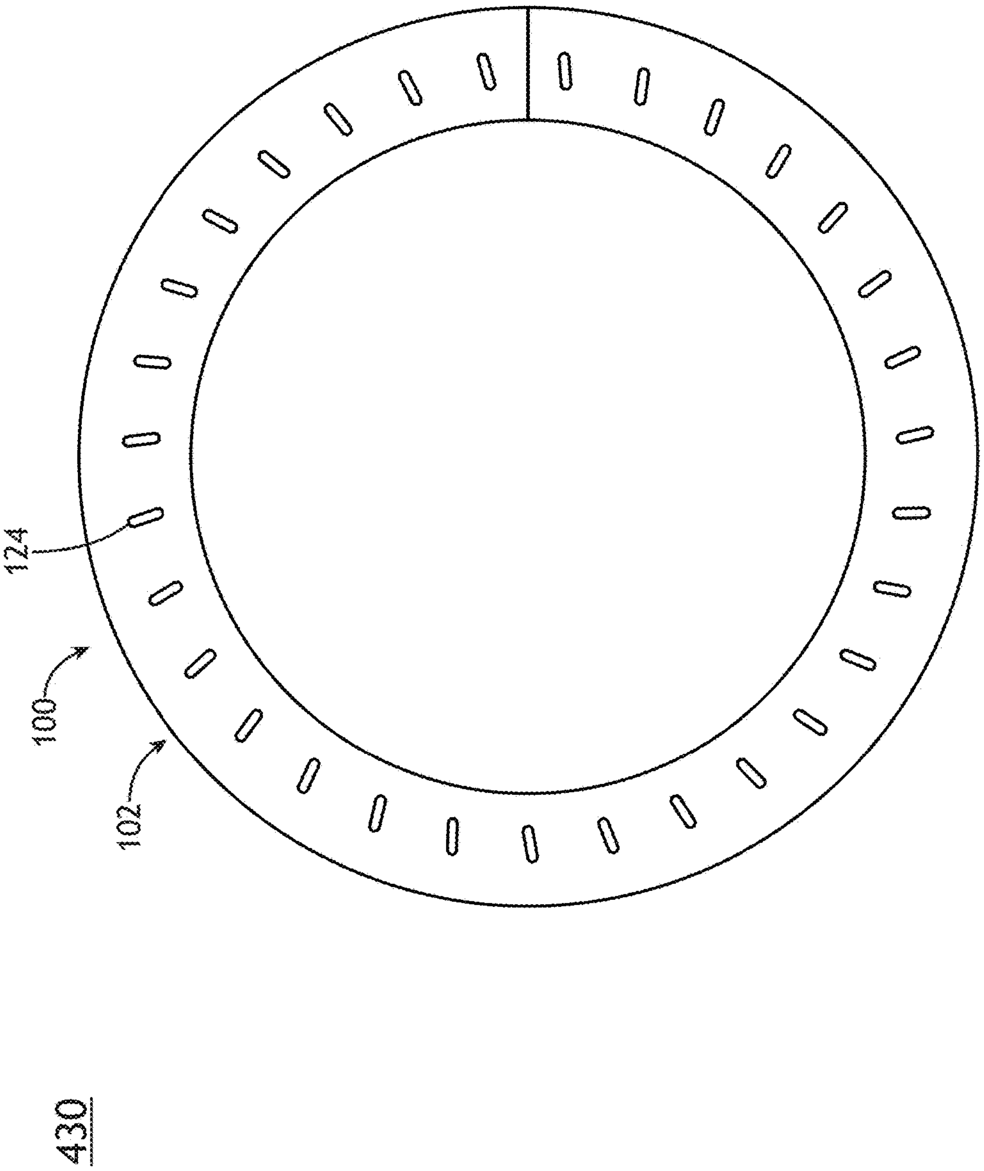
FIG. 5E illustrates a top view of the core ring after the arc segment is pierced to define blade slots, in accordance with one or more embodiments of the present disclosure.
Figure 5F:
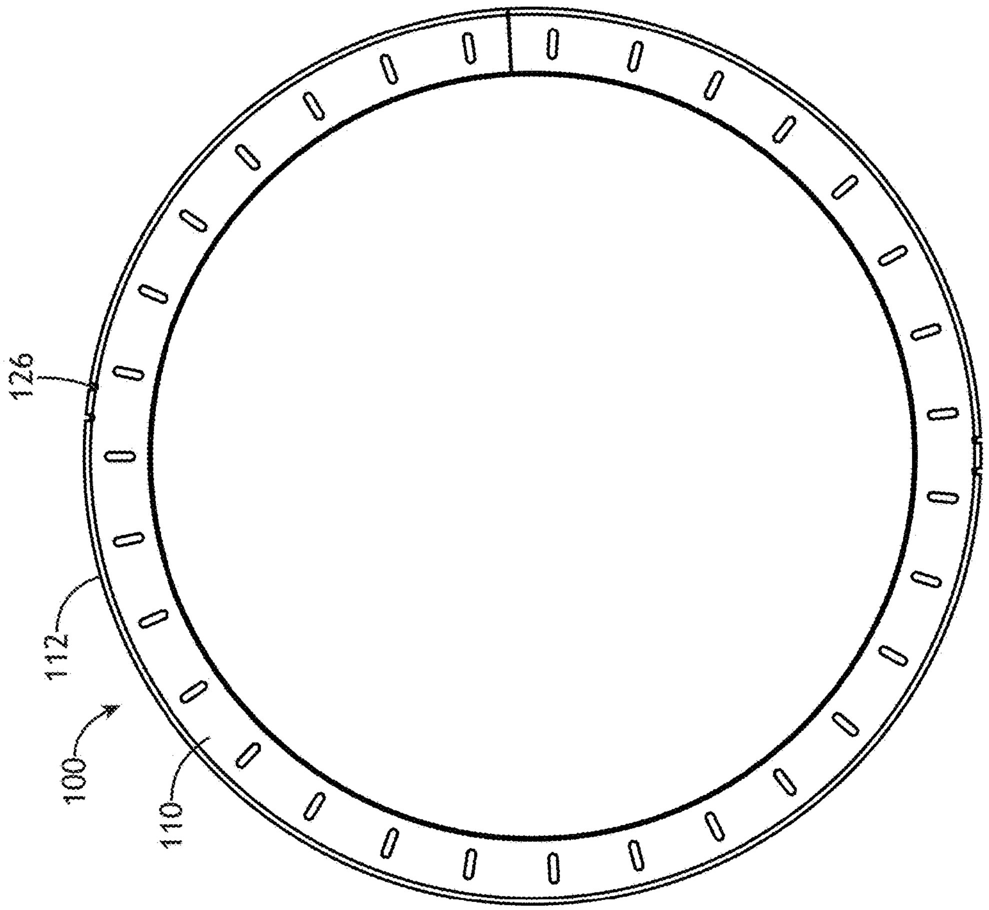
FIG. 5F illustrates a top view of the core ring after the arc segment and the butt connection are stamped, in accordance with one or more embodiments of the present disclosure.

FIG. 4 illustrates a flow diagram of a method 400, in accordance with one or more embodiments of the present disclosure. The method 400 may be a method of manufacturing the core ring 100. The method 400 may improve the utilization of the base metal and reduce scrap when manufacturing the core ring 100. The embodiments and enabling technologies described previously herein in the context of the core ring 100 should be interpreted to extend to method 400. It is further noted, however, that the method is not limited to the architecture of the core ring 100. The method 400 may be further understood with reference to FIGS. 5A-5F.

In a step 410, a flat strip may be rolled into an arc segment. For example, the flat strip 502 may be rolled into the arc segment 102. Rolling the flat strip 502 into the arc segment 102 may be beneficial to reduce metal scrap when manufacturing the core ring 100, as compared to stamping the core ring 100 from a sheet metal blank.

The arc segment 102 may include the first circumferential end 106, the second circumferential end 108, the inner-diameter surface 114, the outer-diameter surface 116, the blade-side surface 118, and/or the stator-side surface 120 after rolling. However, the arc segment 102 may be in the shape of a flat annulus after rolling. In this regard, the arc segment 102 may not include the curved-base portion 110 and/or the lip portion 112 after rolling.

The flat strip 502 may be made of the base metal of the arc segment 102. The flat strip 502 may be a rectangle with a length, a width, and a thickness. The length and width may be bigger than the thickness. The length may also be bigger than the width. The flat strip 502 may be rolled about the width of the flat strip 502 to define the radial width of the arc segment 102. The length of the flat strip 502 may define the inner-diameter surface 114 and the outer-diameter surface 116 of the arc segment 102. The thickness of the flat strip 502 may define the thickness of the arc segment 102. The length of the flat strip 502 may be between the circumference of the inner-diameter surface 114 and the circumference of the outer-diameter surface 116. The length of the flat strip 502 may be lengthened to define the outer-diameter surface 116 and may be narrowed to define the inner-diameter surface 114, thereby defining the rolling reduction in the thickness of the arc segment 102 along the axial width.

The flat strip 502 may be rolled into the arc segment 102 at a select temperature. For example, the flat strip 502 may be cold-rolled or hot-rolled into the arc segment 102. If the temperature of the base metal is below or above the recrystallization temperature, then the flat strip 502 is respectively cold-rolled or hot-rolled.

The flat strip 502 may be rolled into the arc segment 102 by roll bending. The rolling may be a metal forming process in which the base metal is passed through the rollers 503 for plastic deformation of the base metal. The flat strip 502 may be rolled around rollers 503 to roll into the arc segment 102. In this method 400, the arc segment 102 is a workpiece produced from the flat strip 502 by passing the flat strip 502 between three staggered rolls. For example, the flat strip 502 may be rolled around the rollers 503 in a configuration with an inner roller and a pair of outer rollers. The inner roller may also be referred to as a mandrel roller. The pair of outer rollers may also be referred to as guide rollers. The inner roller and the pair of outer rollers may be rolled along respective of the first and second lengths of the flat strip 502. The inner roller and the pair of outer rollers may define respective of the inner-diameter surface 114 and the outer-diameter surface 116 of the arc segment 102. The center axis of the arc segment 102 may be parallel to and offset from the center axis of the rollers 503.

The rolling may cause riffling in arc segment 102 the towards the inner-diameter surface 114. The arc segment 102 may be flattened during or after the rolling to remove the riffling.

The first circumferential end 106 and the second circumferential end 108 may abut end-to-end without overlapping and may be unconnected after rolling the arc segment 102.

In a step 420, circumferential ends of the arc segment may be connected by a butt connection. For example, the first circumferential end 106 and the second circumferential end 108 of the arc segment 102 may be connected by the butt connection 104. The butt connection 104 may be formed by welding (e.g., laser welding) or brazing. The butt connection 104 may match the shape of the arc segment 102. In this regard, the butt connection 104 may be flat.

In a step 430, the arc segment may be pierced to define blade slots. For example, the arc segment 102 may be pierced to define the blade slots 124. The piercing may also be referred to as perforating, punching, press-cutting, stamping, or the like.

The blade slots 124 may be defined in the arc segment 102 after the flat strip 502 is rolled into the arc segment 102 and connected with the butt connection 104. In this regard, the blade slots 124 are not defined in the flat strip 502. Defining the blade slots 124 in the arc segment 102 and not the flat strip 502 may be beneficial to increase the accuracy in the position, shape, and/or orientation of the blade slots 124. For example, if the blade slots 124 are defined in the flat strip 502 before rolling, the rolling process may deform the position, shape, and/or orientation of the blade slots 124. Such deformation of the blade slots 124 may cause difficulties when aligning the tabs 314 into the blade slots 124 during assembly of the impeller 304 and the turbine 306. The alignment of the core ring 100 and the tabs 314 may be simplified due to correct positioning. Thus, a blade-tab-to-slot fitment may be improved by the method 400.

In a step 440, the arc segment and the butt connection may be stamped to form a curved-base portion and/or a lip portion. For example, the arc segment 102 and the butt connection 104 may be stamped to form the curved-base portion 110 and/or the lip portion 112. The arc segment 102 and the butt connection 104 may be stamped by one or more sheet metal stamps. The stamping may also define the undercuts 126.

The stamping may change the position, shape, and/or orientation of the blade slots 124. The change in the position, shape, and/or orientation of the blade slots 124 due to stamping may be pre-compensated for when piercing the blade slots 124 to achieve the desired position, shape, and/or orientation after stamping.

Referring generally again to the figures. The torque converter 300 may include additional components which are not depicted, such as, but not limited to, dampers, lockup clutches, and the like. The dampers and/or the lockup clutches may selectively connect and disconnect between the torque converter cover 302 and the turbine shell 316.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, the term “axial” and derivatives thereof, such as “axially,” shall be understood to refer to a direction along the axis. The term “coaxial” shall be understood to refer to a common axis. Further, the term “radial” and derivatives thereof, such as “radially,” shall be understood in relation to the axis. For example, “radially outward” refers to further away from the axis, while “radially inward” refers to nearer to the axis. The term “circumference” or derivatives thereof, such as “circumferentially”, may also be defined in reference to the center axis.

As used herein, directional terms such as “top,” “bottom,” “over,” “under,” “upper,” “upward,” “lower,” “down,” and “downward” are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS

100 core ring
100*a* core ring
100*b* core ring
102 arc segment
104 butt connection
106 first circumferential end
108 second circumferential end
110 curved-base portion
112 lip portion
114 inner-diameter surface
116 outer-diameter surface
118 blade-side surface
120 stator-side surface
122 peak
124 blade slots
126 undercuts
300 torque converter
301 center axis
302 torque converter cover
303 impeller shell
304 impeller
306 turbine
308 torque converter stator
310 torque converter hub
312 blades
312*a* blades
312*b* blades
314 tabs
316 turbine shell
400 method
410 step
420 step

430 step
440 step
502 flat strip
503 rollers

What is claimed:

1. A core ring for a torque converter, the core ring comprising:

an arc segment revolved about a center axis of the core ring, the arc segment comprising a first circumferential end and a second circumferential end disposed at opposing ends of the arc segment, the first circumferential end and the second circumferential end abutting end-to-end without overlapping, the arc segment comprising a curved-base portion, the curved-base portion defining a plurality of blade slots in a polar array about the center axis of the core ring, the curved-base portion is a curved-annular shape with an inner bend and an outer bend, the arc segment comprises an inner-diameter surface, an outer-diameter surface, a blade-side surface, and a stator-side surface, the blade-side surface and the stator-side surface extend between the inner-diameter surface and the outer-diameter surface, the blade-side surface defines the outer bend, the stator-side surface defines the inner bend, the arc segment comprising a lip portion, the lip portion protrudes radially outward from the curved-base portion; and a butt connection connecting between the first circumferential end and the second circumferential end.

2. The core ring of claim 1, wherein a base metal of the curved-base portion defining the plurality of blade slots comprises a smaller grain microstructure than the base metal of the curved-base portion disposed between the plurality of blade slots.

3. The core ring of claim 1, wherein the arc segment is formed of a flat strip which is rolled about a width of the flat strip to form the arc segment as a flat-annular shape, wherein a sheet thickness of the flat-annular shape is through the center axis of the core ring, wherein the first circumferential end and the second circumferential end are connected by the butt connection after rolling, wherein the arc segment is pierced to define the plurality of blade slots after the butt connection connects the first circumferential end and the second circumferential end, wherein the arc segment and the butt connection are stamped to form the curved-base portion after the plurality of blade slots are defined.

4. The core ring of claim 1, wherein the arc segment comprises a sheet thickness, wherein the sheet thickness decreases along a radial width of the arc segment.

5. The core ring of claim 1, wherein the arc segment is continuous between the first circumferential end and the second circumferential end.

6. The core ring of claim 1, wherein the butt connection is one of a weld joint or a braze joint.

7. The core ring of claim 1, wherein the butt connection is disposed between a pair of adjacent of the plurality of blade slots.

8. The core ring of claim 1, wherein the outer-diameter surface faces radially outwards.

9. The core ring of claim 1, wherein the lip portion is bent opposing to the inner bend and the outer bend.

10. The core ring of claim 1, wherein the curved-base portion comprises a peak, wherein the peak is radially disposed between and axially offset from the inner-diameter surface and the outer-diameter surface, wherein the plurality of blade slots are defined through the peak.

11. The core ring of claim 1, wherein the first circumferential end, the second circumferential end, and the butt connection are shaped as the curved-base portion and the lip portion, wherein the inner-diameter surface together with radially-inner sections of the blade-side surface and the stator-side surface define the curved-base portion, wherein the outer-diameter surface together with radially-outer sections of the blade-side surface and the stator-side surface define the lip portion.

12. The core ring of claim 1, wherein the arc segment defines undercuts axially through the lip portion.

13. The core ring of claim 1, wherein a base metal of the arc segment is one of steel, aluminum, or an alloy thereof.

14. The core ring of claim 1, wherein the core ring is one of an impeller core ring or a turbine core ring.

15. A torque converter comprising:

an impeller; and a turbine, at least one of the impeller or the turbine comprising:

a plurality of blades; and a core ring comprising:

an arc segment revolved about a center axis of the core ring, the arc segment comprising a first circumferential end and a second circumferential end disposed at opposing ends of the arc segment, the first circumferential end and the second circumferential end abutting end-to-end without overlapping, the arc segment comprising a curved-base portion, the curved-base portion defining a plurality of blade slots in a polar array about the center axis of the core ring, the curved-base portion is a curved-annular shape with an inner bend and an outer bend, the arc segment comprises an inner-diameter surface, an outer-diameter surface, a blade-side surface, and a stator-side surface, the blade-side surface and the stator-side surface extend between the inner-diameter surface and the outer-diameter surface, the blade-side surface defines the outer bend, the stator-side surface defines the inner bend, the arc segment comprising a lip portion, the lip portion protrudes radially outward from the curved-base portion; and a butt connection connecting between the first circumferential end and the second circumferential end, the plurality of blades supported on the core ring, the plurality of blades comprising a plurality of tabs passing through the plurality of blade slots, the plurality of blades joined to the arc segment of the core ring by the plurality of tabs.

16. The torque converter of claim 15, wherein a base metal of the curved-base portion defining the plurality of blade slots comprises a smaller grain microstructure than the base metal of the curved-base portion disposed between the plurality of blade slots.

17. The torque converter of claim 15, wherein the plurality of tabs are folded over onto the curved-base portion.

18. A method of manufacturing a core ring, the method comprising:

rolling a flat strip about a width of the flat strip into an arc segment, the arc segment comprising a first circumferential end and a second circumferential end, the first circumferential end and the second circumferential end disposed at opposing ends of the arc segment, the first circumferential end and the second circumferential end abutting end-to-end without overlapping;

connecting the first circumferential end and the second circumferential end by a butt connection;

piercing the arc segment to define a plurality of blade slots; and stamping the arc segment and the butt connection to form a curved-base portion, the core ring comprising:

the arc segment revolved about a center axis of the core ring, the arc segment comprising the curved-base portion, the curved-base portion defining the plurality of blade slots in a polar array about the center axis of the core ring, the curved-base portion is a curved-annular shape with an inner bend and an outer bend, the arc segment comprises an inner-diameter surface, an outer-diameter surface, a blade-side surface, and a stator-side surface, the blade-side surface and the stator-side surface extend between the inner-diameter surface and the outer-diameter surface, the blade-side surface defines the outer bend, the stator-side surface defines the inner bend, the arc segment comprising a lip portion, the lip portion protrudes radially outward from the curved-base portion; and the butt connection connecting between the first circumferential end and the second circumferential end.

19. The method of claim 18, wherein a base metal of the curved-base portion defining the plurality of blade slots comprises a smaller grain microstructure than the base metal of the curved-base portion disposed between the plurality of blade slots.

20. The method of claim 18, wherein the plurality of blade slots are defined in the arc segment after the arc segment is connected by the butt connection.

* * * * *